United States Patent Office 3,328,356
Patented June 27, 1967

3,328,356
COATING COMPOSITION PREPARED FROM POLY-
ESTERS OF EPOXIDIZED ALIPHATIC ACIDS
AND ORGANIC POLYISOCYANATES
Karl Brack, Wilmington, Del., assignor to Hercules
Incorporated, a corporation of Delaware
No Drawing. Filed Mar. 28, 1963, Ser. No. 268,560
The portion of the term of the patent subsequent to
May 18, 1982, has been disclaimed
8 Claims. (Cl. 260—77.5)

This application is a continuation-in-part of my copending application Ser. No. 141,020, filed Sept. 27, 1961, now United States Patent 3,184,439.

This invention relates to polyurethane coating compositions. More particularly, the invention relates to polyurethane coating compositions prepared from linear polymeric esters and polyisocyanates.

It is known in the art to prepare polyurethanes from polyols and isocyanates. The reaction can be shown as follows:

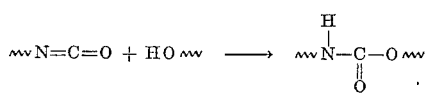

The polymers take their name from the urethane linkages formed. Depending on the nature of the reactants and the process used, the resulting polymer can take one of several forms, such as, foams, synthetic rubbers, adhesives, coatings, fibers, molding compounds, etc. Unfortunately, in the past polyurethane coatings have been sensitive to moisture and organic solvents.

It has now been discovered that certain linear polymeric esters can be used in the preparation of polyurethane coating compositions to produce coatings which are inert to organic solvents and have less moisture sensitivity.

Accordingly, the present invention relates to polyurethane coating compositions comprising the reaction product of an organic polyisocyanate and a polyol containing from about 10% to about 100% by weight of a linear polymeric ester having the general formula:

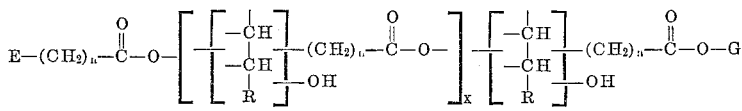

in which R is a substituent of the group consisting of hydrogen and alkyl radicals; $n$ is a whole number from 0 to 20, inclusive; $x$ is at least 1; W is a substituent of the group consisting of hydrogen, hydroxyalkyl radicals and halohydroxyalkyl radicals; and B is a substituent of the group consisting of

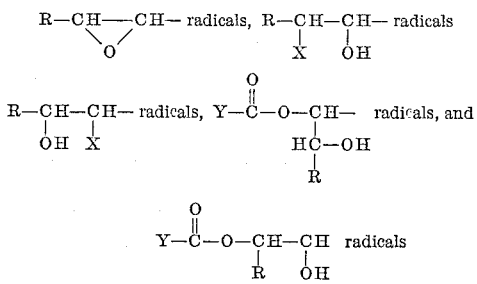

in which R has the same significance as set forth above, X is a hydrogen, halogen or —OH substituent, and Y is hydrogen or alkyl.

In accordance with this invention, polyurethane coating compositions are prepared by mixing and reacting the following basic ingredients: a polyol containing at least 10% by weight of a linear polymeric ester as defined above and an organic polyisocyanate. Some reaction usually occurs at room temperature spontaneously. An amine catalyst can be used but is not necessary.

The polymeric esters employed in accordance with the instant invention are linear polyesters having a plurality of OH substituent groups attached at regular intervals along the polymer chain and which may or may not be terminated with hydroxyalkyl or halohydroxyalkyl end groups. The preparation of the linear polymeric esters and end termination is fully described in my copending parent patent application, Ser. No. 141,020. As stated therein, the polymeric esters are prepared by heating either an epoxidized aliphatic acid or a halohydrated aliphatic acid or mixture thereof with or without a basic catalyst. Those polymeric esters prepared from epoxidized aliphatic acids such as 9,10-epoxystearic acid, 10,11-epoxyundecanoic acid, etc., are most preferred. If end termination is desired, a chain terminator (epihalohydrin or alkylene oxide) can be added during or preferably at the end of the polymerization.

The polymeric esters can be blended with one or more polyols before reaction with the polyisocyanate to change the physical properties of the coating, e.g., flexibility, hardness, resistance to heat, resistance to chemicals, aging characteristics, etc. The only limitation on such blends is that the resulting blends contain at least 10% by weight of the linear polymeric ester. Exemplary of the polyols which can be used in such blends are: triisopropanolamine, poly(propylene oxide), polyester polyols, [N,N,N',N'-tetrakis(2-hydroxypropyl)]ethylene diamine, propylene oxide adducts of sorbitol in which the sorbitol to propylene oxide molar ratio is from 1:6 to 1:24, propylene oxide adducts of trimethylolpropane in which the trimethylolpropane to propylene oxide molar ratio is from 1:3 to 1:36, propylene oxide adducts of pentaerythritol in which the pentaerythritol to propylene oxide molar ratio is from 1:4 to 1:8, etc.

Any organic polyisocyanate can be employed in accordance with the instant invention. Most preferably, the isocyanate will be an aromatic polyisocyanate. Examples of the polyisocyanates which can be employed include: polymethylene diisocyanates such as ethylene diisocyanate, trimethylene diisocyanate, dodecamethylene diisocyanate, hexamethylene diisocyanate, tetramethylene diisocyanate, pentamethylene diisocyanate; alkylene diisocyanates such as propylene-1,2-diisocyanate, 2,3-dimethyl tetramethylene diisocyanate, butylene-1,2-diisocyanate, butylene-1,3-diisocyanate; alkylidene diisocyanates such as ethylidene diisocyanate and heptilidene diisocyanate; cycloalkylene diisocyanates such as 1,4-diisocyantocyclohexane, cyclopentanyl-1,3-diisocyanate; aromatic polyisocyanates such as m-phenylene diisocyanate, p-phenylene diisocyanate, 1-methylphenyl-2,4-diisocyanate, 1-methylphenyl-2,6-diisocyanate, naphthalene - 1,4 - diisocyanate, naphthalene-1,5-diisocyanate, diphenyl-4,4'-diisocyanate, benzene-1,2,4-triisocyanate, xylylene - 1,4 - diisocyanate, xylylene-1,3-diisocyanate, 4,4'-diphenylenemethane diisocyanate, 1-chlorophenyl-2,4-diisocyanate, 4,4'-diphenylene propane diisocyanate; and aliphatic-aromatic diisocyanates such as methylene bis(4-phenyl) diisocyanate, phenylethylene diisocyanate, polymethylene polyphenylisocyanate, etc. Theoretically, there should be sufficient isocyanate groups to react with all of the OH groups of the polymeric ester. In practice, however, there can be considerable variation in the ratio of the two reactants. Normally one would not use a great excess of polyisocyanate since it is by far the more expensive reactant. An excess of polymeric ester over polyisocyanate can be, and many times is, used.

As stated above, a catalyst can be used in the process of this invention. However, such use is a matter of choice and not necessity. The catalyst used will generally comprise a tertiary amine such as triethylenediamine, tetramethylbutanediamine, triethylamine, triethanolamine, N-methylmorpholine, N,N'-diethylpiperazine, N,N-dimethylhexahydroaniline, tribenzylamine, N,N-dimethylbenzylamine, etc., or a metal compound such as stannous octoate, zinc octoate, dibutyl tin dilaurate, ferric acetylacetonate, etc., or a mixture of any of the above. The amount of catalyst can be varied over a wide range; but, in general, the tertiary amines will be used in an amount of from about 0.1% to about 2.0% by weight and the metal compound in an amount of from about 0.1% to about 2.0% by weight, based on total ingredients.

While some reaction between the polyol and the polyisocyanate usually occurs spontaneously at room temperature, complete curing takes at least several hours. It will be obvious to those skilled in the art that it may be desirable to accelerate the reaction by the application of heat. Thus, if rapid curing of the coating is desired, gentle heating can be applied. In general, a temperature of from about 80° C. to about 150° C. will be sufficient. An exception to spontaneous reaction at room temperature occurs in the use of blocked isocyanates, which must be heated as explained below.

There are several methods which can be used to prepare the polyurethane coatings of this invention. These methods fall into three general categories:

(1) The two-package method in which the polyol is mixed with the polyisocyanate just prior to use. This is the preferred method.

(2) The blocked isocyanate method in which the free isocyanate groups in the polymer are blocked by reaction with phenol. The reaction is reversible and, upon the application of heat, i.e., above about 149° C., phenol is regenerated to give free isocyanate groups capable of cross-linking by reaction with either the moisture present or free hydroxyl groups present in the polyols.

(3) The moisture-cured method in which a small number of free isocyanate groups are left in the polymer. In this method the coating composition must be stored under anhydrous conditions and, at the time of application, the free isocyanate groups react with the moisture in the air to cross-link the composition.

The polyurethane coating compositions of this invention can and often do contain other ingredients such as drying agents, thickeners, stabilizers, antioxidants, dyes, pigments, plasticizers, etc., but the presence or absence of such ingredients is immaterial to the invention. They can be used in all areas common to coating composition and can be applied in any of the usual ways, i.e., brushing, rolling, dipping, or spraying.

The following examples are presented for purposes of illustration, parts and percentages being by weight unless otherwise specified.

*Example 1*

This example demonstrates the preparation and application of a coating composition using the two-package method.

To 100 parts of an epichlorohydrin-terminated poly-(9,10-epoxystearic acid), having an equivalent weight of 293.9 and an acid number of 1.8, dissolved in 204 parts of toluene was added 32.6 parts of toluene diisocyanate (80:20 mixture of 2,4- to 2,6-toluene diisocyanate). The resulting solution had a Brookfield viscosity of 10 cps. After 5½ hours at room temperature, the viscosity of the solution had increased to 15 cps. Films were cast from the initial low viscosity solution on plate glass and bonderized steel substrates (steel treated with an aqueous zinc phosphate solution) using an 0.012-inch casting knife. These films were allowed to dry at room temperature for ½ hour and then heat cured for 1 hour at 150° C. The Sward hardness of the resulting films, both on glass and steel, was 30 at a thickness of 1–2 mils. A sample of the film from the glass was removed and tested to determine its physical properties. It was found to have a tensile strength of 2600 p.s.i., an elongation of 60%, and tensile modulus of 60,000 p.s.i. The sample of film on the bonderized steel was exposed for three months in an indoor weathering machine equipped with light source to simulate sunshine, spraying facilities to simulate rain, as well as temperature and humidity controls. At the end of this period, the film was continuous and no harmful effects to the bonderized steel were observed. The Sward hardness of the film after exposure in the weathering machine was 35.

*Example 2*

This example demonstrates the preparation and application of a 100% solids coating composition.

To 100 parts of an epichlorohydrin-terminated poly (9,10-epoxystearic acid) having an equivalent weight of 240 and an acid number of 2.4 was added 29 parts of toluene diisocyanate (80:20 mixture of 2,4- to 2,6-toluene diisocyanate) and the two materials mixed by mechanical stirring. From the resulting viscous liquid mixture, films were cast on plate glass and bonderized steel substrates using an 0.008-inch knife. Each film was heat cured for 1 hour at 100° C. The Sward hardness of the resulting films was 6.5 at a thickness of 2.6–3.1 mils. A sample of the film on glass was removed and its physical properties determined. It was found to have a tensile strength of 2400 p.s.i., an elongation of 54%, and a tensile modulus of 50,000 p.s.i. The sample of film on the bonderized steel was exposed for three months in the weathering machine described in Example 1. At the end of this time, the film was glossy and continuous, and its Sward hardness had increased to 24.

*Example 3*

To 100 parts of an epichlorohydrin-terminated poly-(9,10-epoxystearic acid) having an equivalent weight of 259 and an acid number of 2.3 was added 31.4 parts of toluene diisocyanate (80:20 mixture of 2,4- to 2,6-toluene diisocyanate), and the two materials mixed by mechanical stirring. The resulting mixture had an initial Brookfield viscosity of 5,500 cps. After 1 hour the viscosity was 33,000 cps. and after 2 hours, 100,000 cps. From the initial mixture, films were cast on plate glass and bonderized steel substrates, using an 0.012-inch casting knife. These films were allowed to dry at room temperature for ½ hour and then heat cured for 1 hour at 150° C. The Sward hardness of the resulting films was 28.5 at a thickness of 3–4 mils. A sample of the film on glass was removed and tested to determine its physical properties. It was found to have a tensile strength of 4,900 p.s.i., an elongation of 6%, and a tensile modulus of 140,000 p.s.i. The sample of film on the bonderized steel was exposed for 114 days in the weather machine described in Example 1. At the end of this time, the film was glossy and continuous.

*Example 4*

This example demonstrates the use of an alkylene oxide terminated polymeric ester.

To 100 parts of a propylene oxide terminated poly-(9,10-epoxystearic acid) having an equivalent weight of 286 and an acid number of 1.9 was added 33.5 parts of toluene diisocyanate (80:20 mixture of 2,4- to 2,6-toluene diisocyanate) and the two materials mixed well with mechanical stirring. The resulting viscous mixture had a Brookfield viscosity of 2400 cps. and a room temperature pot life of 4 hours. Films were cast from the solution both on plate glass and bonderized steel substrates using an 0.008-inch casting knife. Each film was cured for 1 hour at a temperature of 150° C. The Sward hardness of each film was 18.5 at a thickness of 2–5 mils. A sample of the film on glass was removed and tested for its physical properties. It was found to have a tensile strength of 3,380 p.s.i., an elongation of 32%, and a tensile modulus of 123,000 p.s.i. The film on the bonderized steel substrate was exposed for three months in the weather machine described in Example 1. At the end of this period, the Sward hardness of the film was found to have increased to 46 and the steel substrate was in good condition.

*Example 5*

This example demonstrates the use of a mixture of a polymeric ester and another polyol.

To a mixture of 100 parts of epichlorohydrin-terminated poly(9,10-epoxystearic acid) having an equivalent weight of 250 and an acid number of 2.1 and 7.7 parts of 1,4-butanediol was added 49.8 parts of toluene diisocyanate (80:20 mixture of 2.4- and 2,6-toluene diisocyanate) and the whole blended with a mechanical stirrer. The resulting solution had a room temperature pot life of 2 hours. The mixture was used to cast films on plate glass and bonderized steel substrates with an 0.008-inch casting knife. Each film was cured 1 hour at a temperature of 150° C. The resulting films had a Sward hardness of 20 at a thickness of 1–3.6 mils. A sample of the film from the glass was removed and tested for its physical properties. It was found to have a tensile strength of 5,800 p.s.i., an elongation of 11%, and a tensile modulus of 90,000 p.s.i.

*Example 6*

This example demonstrates the use of a mixture of a polymeric ester and another polyol.

To a mixture of 100 parts of epichlorohydrin-terminated poly(9,10-epoxystearic acid) having an equivalent weight of 250 and an acid number of 2.1 and 14.2 parts of the 4:1 propylene oxide adduct of pentaerythritol was added 49.8 parts of toluene diisocyanate (80:20 mixture of 2,4- to 2,6-toluene diisocyanate) and the whole blended with a mechanical stirrer. The resulting solution had a room temperature pot life of 4 hours. From this viscous liquid, films were cast on plate glass and bonderized steel substrates using an 0.008-inch casting knife. Each film was cured for 1 hour at a temperature of 150° C. The resulting films had a Sward hardness of 28 at a thickness of 2–5 mils. A sample of the film on glass was removed and its physical properties determined. It was found to have a tensile strength of 6200 p.s.i., an elongation of 8.5%, and a tensile modulus of 118,000 p.si.

*Example 7*

This example demonstrates the use of a mixture of a polymeric ester and another polyol.

To 100 parts of the epichlorohydrin-terminated poly (9,10-epoxystearic acid) described in Example 6 and 13.4 parts of a 4:1 ethylene oxide adduct of pentaerythritol was added 49.8 parts of toluene diisocyanate (80:20 mixture of 2,4- to 2,6-toluene diisocyanate) and the whole blended with a mechanical stirrer. The resulting solution had a room temperature pot life of 4 hours. From the viscous liquid, films were cast on plate glass and bonderized steel substrates using an 0.008-inch casting knife. Each film was cured for 1 hour at a temperature of 150° C. The resulting films had a Sward hardness of 25 at a thickness of 2–5.5 mils. The sample of the film on glass was removed and tested to determine its physical properties. It was found to have a tensile strength of 5300 p.s.i., an elongation of 11%, and a tensile modulus of 126,000 p.s.i.

*Example 8*

This example demonstrates the use of a nonterminated polyester.

To a solution of 100 parts of a poly(9,10-epoxystearic acid) having an acid number of 44.8, an ester number of 150.5, a hydroxyl number of 128, and a molecular weight of 1556, dissolved in 360 parts of tetrahydrofuran, was added 34 parts of toluene diisocyanate (80:20 mixture of 2,4- to 2,6-toluene diisocyanate), and the whole blended with a mechanical stirrer. After ½ hour the resulting solution was used to cast a film on plate glass using a 0.03-inch casting knife. It was allowed to cure at room temperature for 5 hours. The resulting film was clear, hard and insoluble in tetrahydrofuran or methyl isobutyl ketone. After 2 days, it had a Sward hardness of 34 at a thickness of 5 mils.

*Example 9*

This example demonstrates the use of a nonterminated polyester and heat curing.

The solution of the nonterminated poly(9,10-epoxystearic acid) and toluene diisocyanate in tetrahydrofuran as described in Example 8 was cast as a film on plate glass. It was allowed to dry for ½ hour at room temperature and was then cured at a temperature of 150° C. for 1 hour. The resulting film was clear, hard, insoluble in tetrahydrofuran or methyl isobutyl ketone and had a Sward hardness of 40 at a thickness of 6 mils.

*Example 10*

This example demonstrates the use of a nonterminated polyester and a tertiary amine catalyst.

To the solution of the nonterminated poly(9,10-epoxystearic acid) and toluene diisocyanate in tetrahydrofuran as described in Example 8 was added 0.25 part of triethylenediamine. From the resulting solution a film was cast on plate glass using a 0.03-inch casting knife. After curing for 2 hours at room temperature, the film was clear, hard, insoluble in tetrahydrofuran or methyl isobutyl ketone, and had a Sward hardness of 32 at a thickness of 2 mils.

*Example 11*

This example demonstrates the preparation and application of a coating composition using the blocked isocyanate method.

To 100 parts of toluene diisocyanate (80:20 mixture of 2,4- to 2,6-toluene diisocyanate) dissolved in 450 parts of tetrahydrofuran was added 0.5 part of triethylenediamine. Then a solution of 200 parts of an epichlorohydrin-terminated poly(9,10-epoxystearic acid) having an acid number of 2.4 and an equivalent weight of 240, dissolved in 725 parts of tetrahydrofuran, was added dropwise with stirring. The resulting solution was agitated at room temperature for ½ hour and then 50 parts of phenol dissolved in 225 parts of tetrahydrofuran was added. The solution was again agitated for ½ hour at room temperature, and then a second 200 part portion of the epichlorohydrin-terminated poly(9,10 - epoxystearic acid) dissolved in 725 parts of tetrahydrofuran was added. The resulting solution was used to cast a film on plate glass using a 0.03-inch casting knife. It was allowed to dry at room temperature and was then cured at 155° C. for 1 hour. A hard, clear, colorless film was obtained which was insoluble in tetrahydrofuran or methyl isobutyl ketone and had a Sward hardness of 22 at a thickness of 3 mils.

*Example 12*

This example demonstrates the preparation of a coating composition using the moisture-cured method.

To 100 parts of toluene diisocyanate (80:20 mixture of 2,4- to 2,6-toluene diisocyanate) dissolved in 450 parts of tetrahydrofuran was added dropwise with stirring a solution of 200 parts of epichlorohydrin-terminated poly(9,10-epoxystearic acid) having an acid number of 2.4 and an equivalent weight of 240, dissolved in 725 parts of tetrahydrofuran. The resulting solution was agitated for 15 minutes, and then cast on plate glass using a 0.03-inch casting knife. The solvent was allowed to evaporate, and the film was cured in an atmosphere of 100% humidity at room temperature for 1 hour. Finally, it was cured at a temperature of 150° C. for 1 hour. The resulting film was clear, hard, insoluble in tetrahydrofuran or methyl isobutyl ketone, and had a Sward hardness of 40 at a thickness of 4 mils.

*Example 13*

This example demonstrates the use of a nonterminated poly(10,11-epoxyundecanoic acid).

To 100 parts of a poly(10,11-epoxyundecanoic acid) having an acid number of 64, an ester number of 215, and a hydroxyl number of 195, dissolved in 400 parts of tetrahydrofuran, was added 1 part of triethylenediamine and 32 parts of toluene diisocyanate (80:20 mixture of 2,4- to 2,6-toluene diisocyanate), and the whole blended with a mechanical stirrer. The resulting solution was used to cast a film on plate glass using a 0.03-inch casting knife. The solvent was allowed to evaporate, and the film was cured at a temperature of 150° C. for ½ hour.

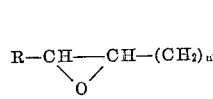

The resulting hard film was insoluble in tetrahydrofuran or methyl isobutyl ketone and had a Sward hardness of 45 at a thickness of 4 mils.

*Example 14*

This example demonstrates the use of an epichlorohydrin-terminated poly(10,11-epoxyundecanoic acid).

To 100 parts of an epichlorohydrin-terminated poly(10,11-epoxyundecanoic acid) having an acid number of 0, an ester number of 250, a hydroxyl number of 260, and a molecular weight of 900, dissolved in 200 parts of tetrahydrofuran, was added 2 parts of triethylenediamine. To this solution was added 38 parts of toluene diisocyanate (80:20 mixture of 2,4- to 2,6-toluene diisocyanate), the whole agitated for 15 minutes at room temperature and then used to cast a film on plate glass. The solvent was allowed to evaporate, and then the film was cured at a temperature of 150° C. for ½ hour. The resulting hard, clear film was insoluble in tetrahydrofuran or methyl isobutyl ketone and had a Sward hardness of 42 at a thickness of 5 mils.

What I claim and desire to protect by Letters Patent is:

1. A polyurethane coating composition comprising the reaction product of an organic polyisocyanate and at least one polyol containing at least 10% by weight of a linear polymeric ester having the general formula:

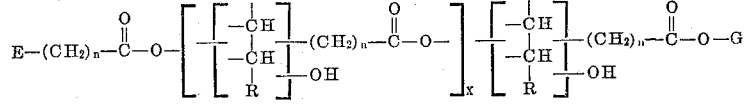

in which R is a substituent of the group consisting of hydrogen and alkyl radicals; $n$ is a whole number from 0 to 20, inclusive; $x$ is at least 1; G is a substituent of the group consisting of hydrogen, hydroxyalkyl radicals and halohydroxyalkyl radicals; and E is a substituent of the group consisting of

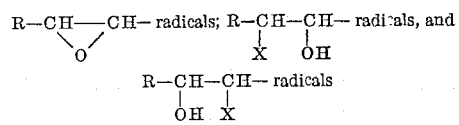

in which R has the same significance as set forth above, and X is a halogen substituent.

2. A polyurethane coating composition comprising the reaction product of an organic polyisocyanate and at least one polyol containing at least 10% by weight of a linear polymeric ester having the general formula:

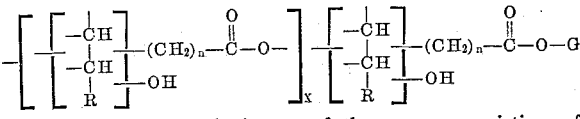

in which R is a substituent of the group consisting of hydrogen and alkyl radicals; $n$ is a whole number from 0 to 20, inclusive; $x$ is at least 1; and G is a substituent of the group consisting of hydrogen, hydroxyalkyl radicals and halohydroxyalkyl radicals.

3. The composition of claim 2 wherein the polyol is a poly(9,10-epoxystearic acid).

4. The composition of claim 2 wherein the polyol is a poly(10,11-epoxyundecanoic acid).

5. The composition of claim 2 wherein the polyol is an epichlorohydrin-terminated poly(9,10 - epoxystearic acid).

6. The composition of claim 2 wherein the polyol is a propylene oxide-terminated poly(9,10 - epoxystearic acid).

7. The composition of claim 2 wherein the polyol is a mixture of epichlorohydrin-terminated poly(9,10-epoxystearic acid) and an alkylene oxide adduct of pentaerythritol.

8. The composition of claim 2 wherein the polyol is a mixture of epichlorohydrin-terminated poly(9,10-epoxystearic acid) and 1,4-butanediol.

References Cited

UNITED STATES PATENTS 3,184,439    5/1965    Brack _____ 260—77.5

OTHER REFERENCES

Official Digest, "The Properties and Application of Urethane Coatings," Edward R. Wells et al., September 1959, 260-77.5. Pages 1181–1210 relied on.

Alien Property Custodian, Serial No. 397, 741, published April 20, 1943.

DONALD E. CZAJA, *Primary Examiner.*

LEON J. BERCOVITZ, *Examiner.*

M. C. JACOBS, F. McKELVEY, *Assistant Examiners.*